United States Patent
Takahashi

[11] Patent Number: 6,040,859
[45] Date of Patent: Mar. 21, 2000

[54] IMAGE SENSING APPARATUS AND METHOD FOR DISCHARGING DARK CURRENT CHARGE STORED THEREIN

[75] Inventor: Tatsuya Takahashi, Gifu-ken, Japan

[73] Assignee: Sanyo Electric Co., Ltd., Osaka, Japan

[21] Appl. No.: 08/774,253

[22] Filed: Nov. 27, 1996

[30] Foreign Application Priority Data

Nov. 30, 1995 [JP] Japan ................................. 7-313324

[51] Int. Cl.$^7$ .............................. H04N 5/335; H04N 9/64
[52] U.S. Cl. .................... 348/243; 348/296; 348/312; 348/314; 348/317; 257/229; 250/208.1
[58] Field of Search .................................. 348/241, 243, 348/250, 294, 296, 297, 311, 312, 314, 315, 316, 317, 319; 250/208.1; 257/223, 229–232; H04N 5/217, 9/64, 5/335

[56] References Cited

U.S. PATENT DOCUMENTS

| | | |
|---|---|---|
| 4,733,302 | 3/1988 | Kinoshita . |
| 4,875,101 | 10/1989 | Endo . |
| 4,908,709 | 3/1990 | Inuiya . |
| 5,057,926 | 10/1991 | Watanabe .......................... 358/213.11 |
| 5,317,408 | 5/1994 | Hirota . |

Primary Examiner—Wendy Garber
Assistant Examiner—Ngoc-Yen Vu
Attorney, Agent, or Firm—Sheridan Ross P.C.

[57] ABSTRACT

A solid state image sensor including a light-receiving section, a storage section, and a clock generator. The clock generator performs a first discharging operation for discharging noise charges in the light-receiving section, a first transferring operation for transferring the noise charges in a reverse direction from the storage to the light-receiving section, and a second discharging operation for discharging the noise charges transferred from the storage into the light-receiving section.

7 Claims, 10 Drawing Sheets

IMAGE SENSING APPARATUS AND METHOD FOR DISCHARGING DARK CURRENT CHARGE STORED THEREIN

BACKGROUND OF THE INVENTION

1. Field of the Invention

The present invention relates to an image sensing apparatus and a method for driving a solid state image sensor. More particularly, the present invention relates to an image sensor that uses a solid state image sensing apparatus employing a frame transfer system and a driving method thereof.

2. Description of the Related Art

An image sensing apparatus, which has a solid state image sensor like a charge coupled device (CCD), controls the exposure of the solid state image sensor to acquire the optimal exposure state. This exposure control employs a iris mechanism, which mechanically controls the amount of incident light to the solid state image sensor in accordance with the luminance of light reflected from a target object to be sensed. Alternatively, the exposure control may use a so-called electronic shutter for controlling the period during which the solid state image sensor accumulates charges in accordance with the luminance of light reflected from the target object.

A solid state image sensor, which accumulates (stores) information charges that are generated in accordance with the incident light, has light-receiving pixels arranged in a matrix form. When an overflow of information charges occurs at some of the light-receiving pixels, excess charges bloom from the light-receiving pixels and the blooming charges tend to get mixed with information charges stored in the light-receiving pixels that are adjacent or located peripherally thereof. To prevent such mixing, an overflow drain is provided adjacent to each light-receiving pixel.

Figure 1:
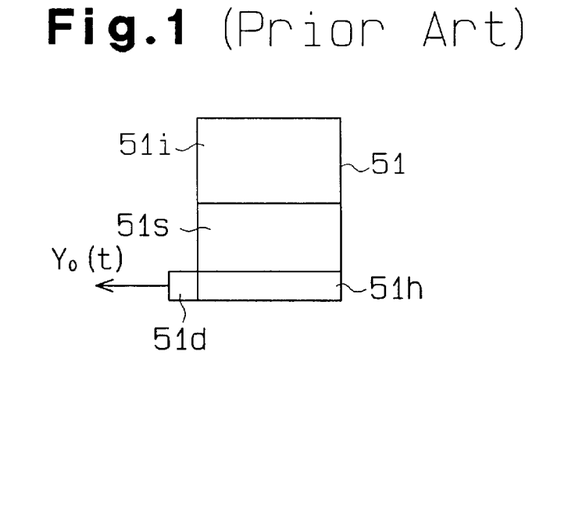
FIG. 1 is a schematic plan view illustrating a prior art CCD solid state image sensor.

FIG. 1 is a block diagram illustrating a prior art image sensing apparatus. The apparatus has a CCD solid state image sensor employing a frame transfer system. The image sensor 51 has a vertical overflow drain structure to absorb excess information charges on the substrate side. The sensor 51 includes a light-receiving section (image sensing section) 51$i$, a storage section 51$s$, a horizontal transfer section 51$h$ and an output section 51$d$. Each section is formed on a semiconductor substrate (not shown). The light-receiving section 51$i$ is formed by a plurality of shift registers, which are arranged in parallel in a horizontal direction. Each shift register has a plurality of bit registers arranged in series in a vertical direction. The individual bit of those shift registers forms a light-receiving pixel, which stores information charges that are produced in accordance with the light reflected from a target object to be sensed. The storage section 51$s$ is formed by a plurality of shift registers arranged in series to the associated shift registers of the light-receiving section 51$i$. The number of bits of each shift register in the storage section 51$s$ is set to match the number of bits of each shift register in the light-receiving section 51$i$. The storage section 51$s$ temporarily stores one screen of information charge packets transferred from the light-receiving section 51$i$.

The horizontal transfer section 51$h$ is comprised of a single shift register having a plurality of bit registers respectively connected to the outputs of a plurality of the shift registers of the storage section 51$s$. The horizontal transfer section 51$h$ receives one screen of information charge packets from the storage section 51$s$ row by row and sequentially outputs those information charges to the output section 51$d$.

The output section 51$d$ includes an electrically isolated capacitor, which receives the information charges from the horizontal transfer section 51$h$ pixel by pixel, and an amplifier, which produces a voltage value signal or a image signal Y0(t) in accordance with a potential change in the capacitor.

When there is no incident light reaching the sensor 51, dark current is generated in the semiconductor substrate of the light-receiving section 51$i$. The dark current gets mixed with the information charges acquired in an image sensing operation and generates noise. The information charges containing the noise are drained out of the light-receiving section 51$i$ by an electronic shutter operation.

Therefore, before the image sensor 51 initiates an image sensing operation, an electronic shutter operation is performed in step (hereinafter referred to as S) 11 in a flowchart of FIG. 2. The operation drains information charges containing noise generated by dark current out of the light-receiving section 51$i$. In S12, the information charges are stored in the light-receiving section 51$i$ for a predetermined period. In S13, the information charges stored in the light-receiving section 51$i$ are transferred to the storage section 51$s$. Then, if the apparatus is in the moving image sensing mode, it goes back to S11 and senses the next frame, and if the apparatus is in the still image sensing mode, it finishes the image sensing operation.

However, the prior art image sensing apparatus cannot drain information charges containing noise caused by dark current generated in the substrate out of the storage section 51$s$.

Generally, in the moving image sensing mode, the storage section 51$s$ stores few information charges containing noise since the image sensor 51 is continually scanned and the information charges are read out therefrom. In other words, dark current generates little noise in the moving image sensing mode.

On the other hand, in the still image sensing mode, the image sensor 51 is not continually scanned and information charges are stored there for a longer period than in the moving image sensing mode. This may increase in the storage section 51$s$ the amount of the information charges containing noise caused by dark current. This increases the noise in the information charges.

SUMMARY OF THE INVENTION

Accordingly, it is an objective of the present invention to provide an image sensing apparatus that is unaffected by noise caused by dark current contained in information charges.

To achieve the foregoing and other objectives and in accordance with the purpose of the present invention, a solid state image sensor includes a light-receiving section having a plurality of light-receiving elements arranged in a matrix form. Each light-receiving element stores an information charge generated in accordance with an incident light reflected from a target object. The solid state image sensor also includes a storage section for temporarily storing the information charges transmitted element by element from the light-receiving section. The solid state image sensor performs an electronic shutter operation for discharging the information charges in the light-receiving section. A clock generator includes a vertical clock generating circuit, a storage clock generating circuit, a horizontal clock generating circuit and substrate clock generating circuit. The clock generator controls the information charge transfer between the light-receiving section and the storage section of the solid state image sensor. The clock generator performs a first discharging operation for discharging noise-containing information charges previously existing in the light-receiving section, a first transferring operation for transferring noise-containing information charges previously existing in the storage section in a reverse direction from the storage section to the light-receiving section, a second discharging operation for discharging noise-containing information charges transferred from the storage section into the light-receiving section, an image sensing operation for storing the information charges generated in accordance with an incident light reflected from a target object in the light-receiving section for a predetermined period of time and a second transferring operation for transferring information charges stored in the light-receiving section in a forward direction from the light-receiving section to the storage section.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

Figure 3:
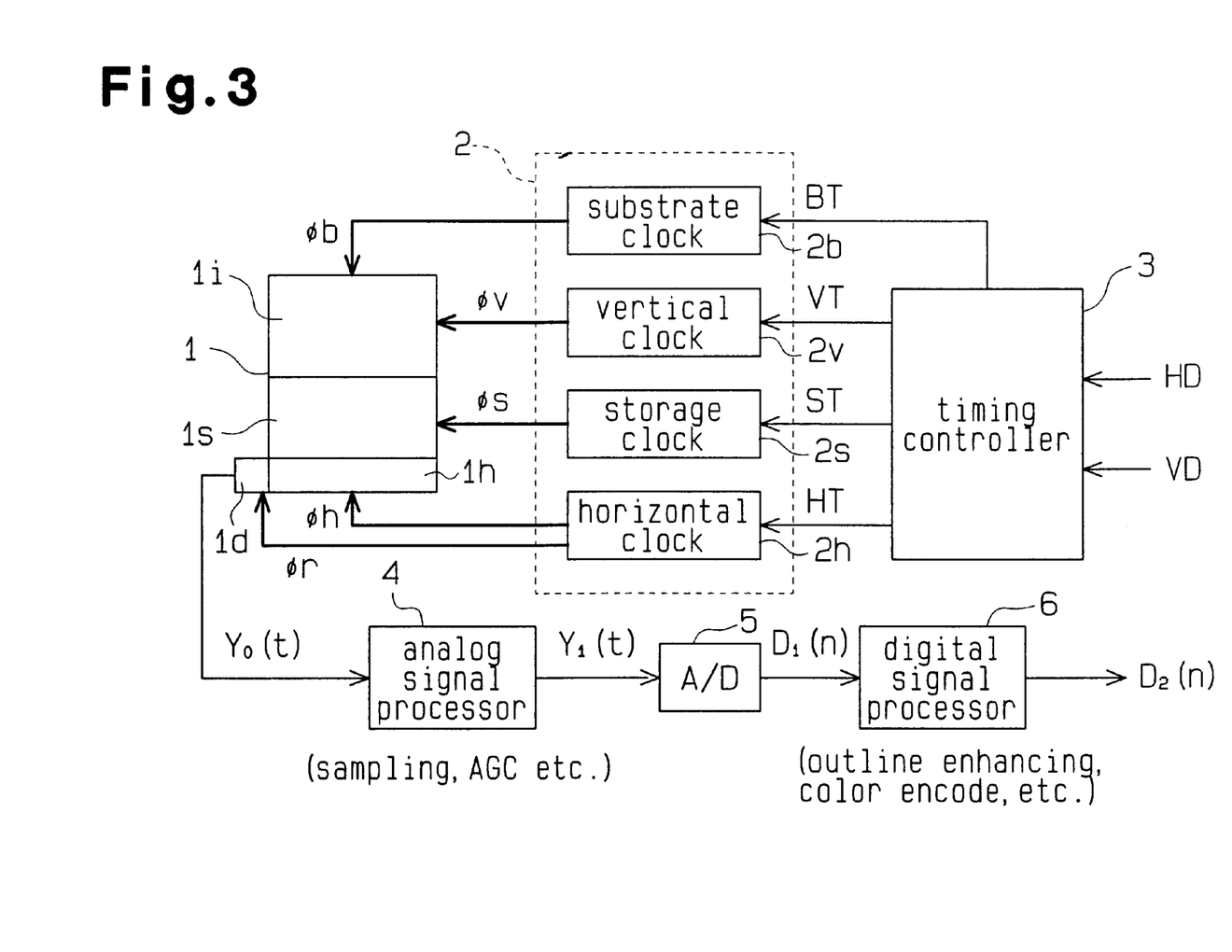
FIG. 3 is a block diagram illustrating a CCD solid state image sensor according to one embodiment of the present invention.

A CCD solid state image sensor 1 having a vertical overflow drain structure according to the present invention will now be described with reference to the drawings. A CCD solid state image sensor 1 includes a light-receiving section (image sensing section) 1$i$, a storage section 1$s$, a horizontal transfer section 1h and an output section 1$d$. Each section is formed on a semiconductor substrate (not shown). The light-receiving section 1$i$ is formed by a plurality of shift registers that are arranged in parallel in a horizontal direction. Each shift register has a plurality of bit registers arranged in series in a vertical direction. The individual bits of those shift registers forms a light-receiving pixel that stores information charges that are produced in accordance with the light reflected from a target object to be sensed. The storage section 1$s$ is formed by a plurality of shift registers arranged in series to the associated shift registers of the light-receiving section 1$i$. The number of bits of each shift register in the storage section 1$s$ is set to match the number of bits of each shift register in the light-receiving section 1$i$. The storage section 1$s$ temporarily stores one screen of information charge packets transferred from the light-receiving section 1$i$ in this manner.

The horizontal transfer section 1$h$ is comprised of a single shift register that has a plurality of bits respectively connected to the outputs of a plurality of the shift registers of the storage section is. The horizontal transfer section 1$h$ receives one screen of information charge packets from the storage section 1$s$ row by row, and sequentially outputs those information charges to the output section 1$d$. The output section 1$d$ includes an electrically isolated capacitor, which receives the information charges from the horizontal transfer section 1h pixel by pixel, and an amplifier that produces a voltage value signal or a image signal Y0(t) in accordance with a potential change in the capacitor.

The clock generator 2 includes a vertical clock generating circuit 2$v$, a storage clock generating circuit 2$s$, a horizontal clock generating circuit 2$h$ and a substrate clock generating circuit 2$b$. The vertical clock generating circuit 2$v$ supplies a vertical clock signal $\phi v$ synchronous with a vertical sync signal VD to the light-receiving section 1$i$. In response to the vertical clock signal $\phi v$, the light-receiving section 1$i$ promptly transfers the information charge packets to the storage section 1s in the blanking period for vertical scanning. The storage clock generating circuit 2$s$ supplies a storage clock signal $\phi s$ synchronous with a horizontal sync signal HD to the storage section 1$s$. In response to the storage clock signal $\phi s$, the storage section 1$s$ receives one screen of information charge packets transferred from the light-receiving section 1i and transfers the received information charge packets to the horizontal transfer section 1h row by row in the blanking period for horizontal scanning.

Figure 4:
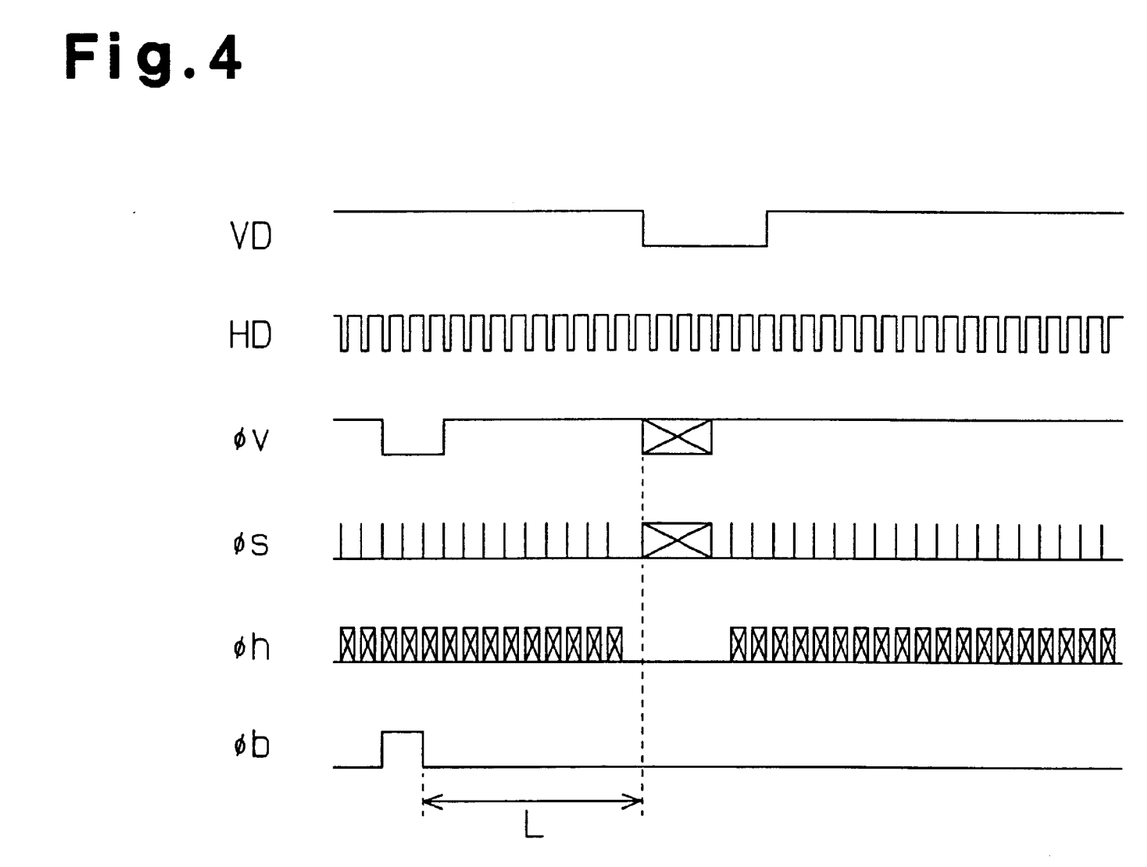
FIG. 4 is a timing chart of signals used in the image sensor of FIG. 3.

The horizontal clock generating circuit 2$h$ supplies a horizontal clock signal $\phi h$ synchronous with the horizontal sync signal HD to the horizontal transfer section 1$h$. In response to the horizontal clock signal $\phi h$, the horizontal transfer section 1$h$ receives one row of information charge packets transferred from the storage section 1$s$ and sequentially transfers those information charge packets to the output section 1$d$. The horizontal clock generating circuit 2$h$ also supplies a reset clock signal Or synchronous with the horizontal clock signal $\phi h$ to the output section 1$d$. In response to the reset clock signal $\phi r$, the output section 1$d$ discharges the information charge packets from the capacitor. The substrate clock generating circuit 2$b$ supplies a substrate clock signal $\phi b$ to a drain region which drains the blooming charges in the light-receiving section 1$i$. The substrate clock signal $\phi b$ rises for a predetermined period during the vertical scan period. This substrate clock signal $\phi b$ is supplied to the light-receiving section 1$i$ to discharge the information charges stored in the pixels of the light-receiving section 1$i$. This is called an electronic shuttering operation. As shown in FIG. 4, therefore, the information-charge storing time of the light-receiving section 1$i$ is indicated by a period L from the point of completion of the discharging of the information charges by the substrate clock signal $\phi b$ to the beginning of the transfer of the information charges by the vertical clock signal $\phi v$. Alteration of the supply timing for this substrate clock signal $\phi b$ permits the information-charge storing period or the shutter speed to be controlled.

The timing controller 3 shown in FIG. 3 generates a vertical timing signal VT synchronous with the vertical scanning in response to the vertical sync signal VD and supplies the vertical timing signal VT to the vertical clock generating circuit 2v. The timing controller 3 generates a storage timing signal ST synchronous with the vertical scanning and horizontal scanning in response to the vertical sync signal VD and horizontal sync signal HD, and supplies the storage timing signal ST to the storage clock generating circuit 2s. The timing controller 3 further generates a horizontal timing signal HT synchronous with the horizontal scanning in response to the horizontal sync signal HD and supplies the horizontal timing signal HT to the horizontal clock generating circuit 2h.

Based on exposure information supplied from a digital signal processor 6, which will be discussed later, the timing controller 3 produces a discharge timing signal BT and supplies the discharge timing signal BT to the substrate clock generating circuit 2b. Based on the exposure information indicative of the over-exposure of the image sensor 1, the timing controller 3 outputs the discharge timing signal BT so as to delay the supply timing for the substrate clock signal φb, thereby shortening the information-charge storing period L. Based on the exposure information indicative of insufficient exposure, on the other hand, the timing controller 3 outputs the discharge timing signal BT so as to quicken the supply timing for the substrate clock signal φb, thereby elongating the information-charge storing period L. This feedback control allows the image sensor 1 to maintain the proper exposure state.

An analog signal processor 4 shown in FIG. 3 receives the image signal Y0(t) from the image sensor 1 and performs signal processing such as sample-and-hold processing and Automatic Gain Control (AGC) processing to produce a processed image signal Y1(t) in a predetermined format. In the sample-and-hold processing, for example, only the difference between the standard level and the signal level is acquired from the image signal Y0(t), which has the standard level and signal level alternately repeated at given periods. In the AGC processing, the gain of the image signal Y0(t) is adjusted so that the average level of the image signal Y1(t) over one screen falls within the proper range.

An A/D converter 5 converts the image signal Y1(t) output from the analog signal processor 4 to a digital image signal D1(n) in synchronism with the output operation of the image sensor 1. The digital signal processor 6 receives the digital image signal D1(n) from the A/D converter 5 and performs outline enhancing and generation of exposure information to produce an image data signal D2(n). When color image sensing is carried out, processes such as white balance control and filtering are performed to produce the image data signal D2(n). The image data signal D2(n) is transferred to the display apparatus after being converted to an analog image signal by a D/A converter, or it is directly recorded on a recording medium by a recording apparatus (not shown).

Figure 5:
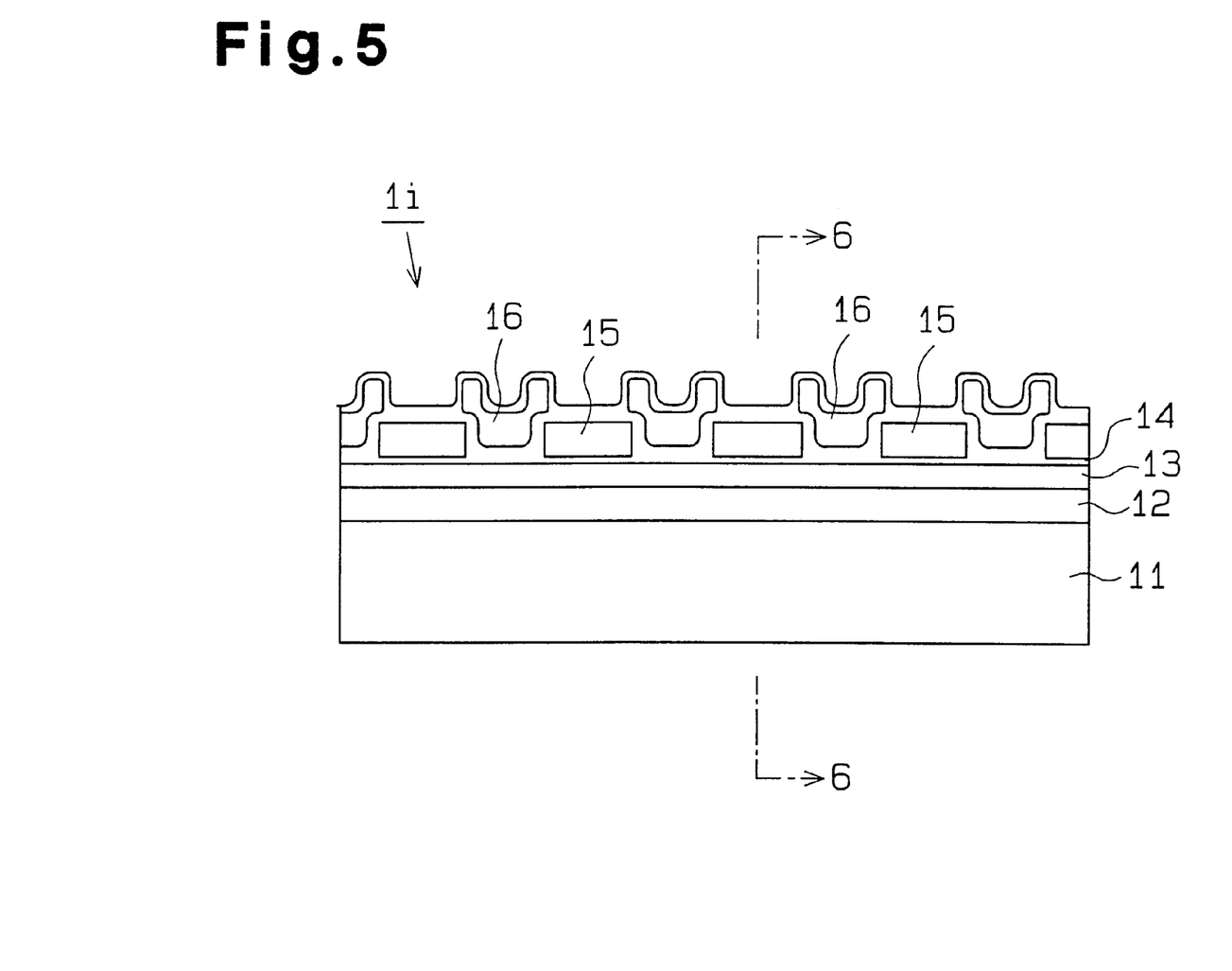
FIG. 5 is a partial cross-sectional view illustrating the image sensor of FIG. 3.
Figure 6:
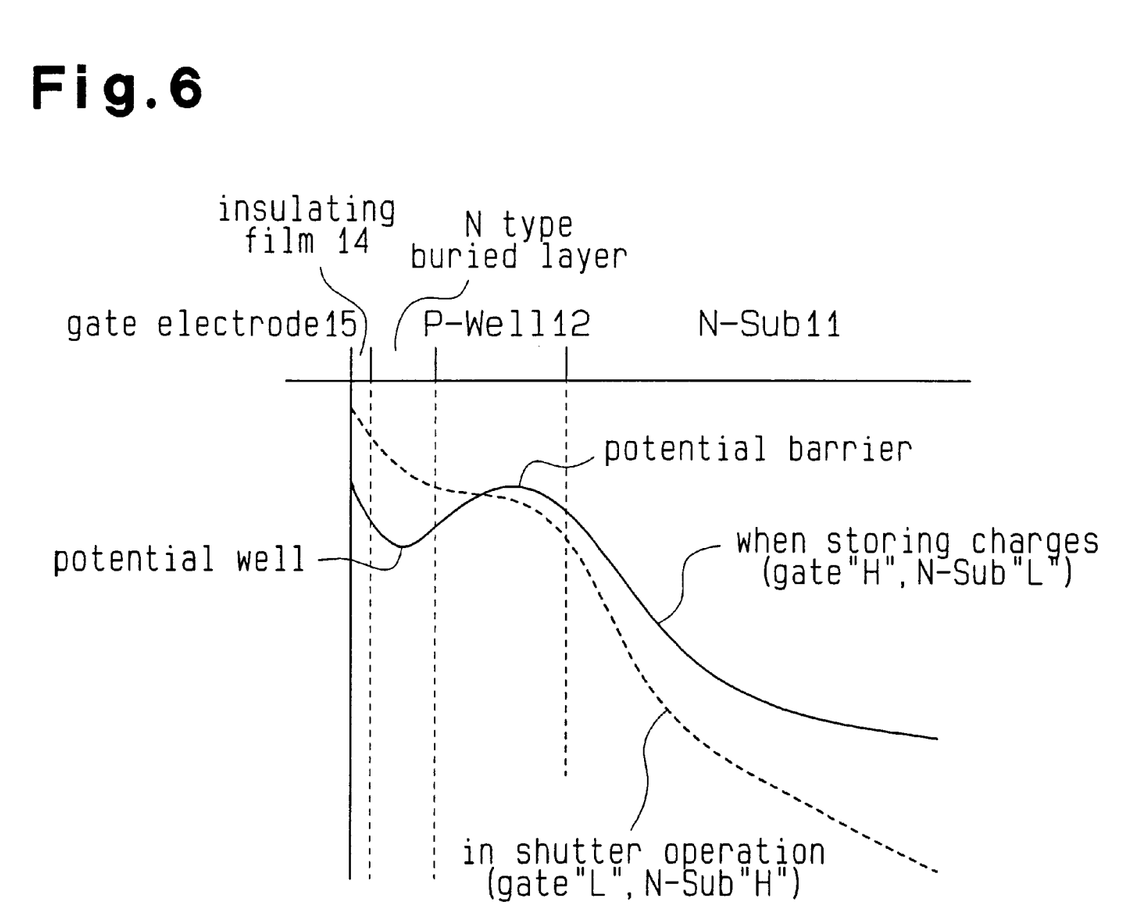
FIG. 6 is a profile illustrating a potential change taken substantially along line 6—6 of FIG. 5.

FIG. 5 is a cross-sectional view of the light-receiving section 1i of the CCD solid state image sensor 1 having the vertical overflow drain structure. In the image sensor 1 of this type, a semiconductor substrate 11 absorbs the charges that overflow in the light-receiving section 1i. FIG. 6 is a profile illustrating a potential change taken substantially along line 6—6 of FIG. 5.

As shown in FIG. 5, the light-receiving section 1i has the semiconductor substrate 11, which has an N type conductivity and is where the drain region is to be formed. Formed on the surface of the N type semiconductor substrate 11 is a diffusion region (P-well region) 12 having a P type conductivity. The drain region in the semiconductor substrate 11 absorbs the charges that overflow in the light-receiving section 1i.

Formed on the surface of this P-well region 12 is a diffusion layer (buried layer) 13, which has an N type conductivity and is where channel regions are to be formed. The buried layer 13 is defined by an isolation region on the surface of the P-well region 12 and extends in one direction. Gate electrodes 15 of a first layer are arranged at given intervals on the buried layer 13 with an insulating layer 14 in between. Gate electrodes 16 of a second layer are arranged between the adjoining first gate electrodes 15 to partially cover the individual first gate electrodes 15. The gate electrodes 15, 16 are respectively supplied with four-phase vertical clock signals φv (see FIG. 7), each of which has a phase difference of 90 degrees from one another, and the semiconductor substrate 11 is supplied with the substrate clock signal φb. The ground voltage is applied to the P-well region 12. The peak-to-peak values of the vertical clock signal φv and the substrate clock signal φb, i.e., the applied voltages to the gate electrodes 15, 16 and semiconductor substrate 11, are set according to the potential of the P-well region 12 taken as a reference.

In the image sensor 1 with the above vertical overflow drain structure, when the light-receiving section 1i stores information charges, the substrate clock signal φb is held low as shown in FIG. 4, and one, two or three of the four-phase vertical clock signals φv are kept high. This selectively enables the gate electrodes 15, 16. In a separating of the light-receiving section 1i where the gate electrodes 15, 16 are enabled, a potential well is formed in each channel region in the buried layer 13 as shown by a solid line in FIG. 6 and a potential barrier is formed in the P-well region 12. This stores information charges in the buried layer 13 to the surface of the P-well region 12. In another part of the light-receiving section 1i where the gate electrodes 15, 16 are disabled with the vertical clock signal φv held low, no potential well is formed in the buried layer 13. A potential barrier for parting the light-receiving pixels is formed in the part instead of a potential well.

In the solid state image sensor 1 of the vertical overflow drain structure, an electronic shutter operation is based on the potential control of the gate electrodes 15, 16 and the semiconductor substrate 11. This shutter operation allows the information charges in the individual light-receiving pixels of the light-receiving section 1i to be simultaneously discharged therefrom. In this operation, all the vertical clock signals φv applied to the gate electrodes 15, 16 are kept low. This shallows the potential well in the buried layer 13. At the same time, the substrate clock signal φb is set high to lower the potential of the semiconductor substrate 11. As a result, the potential barrier in the P-well region 12 disappears as indicated by the broken line in FIG. 6. In this manner, the information charges stored in the potential well in the vicinity of the buried layer 13 are moved to the semiconductor substrate 11 from the buried layer 13 along the gradient of the potential profile and are discharged therefrom.

Figure 7:
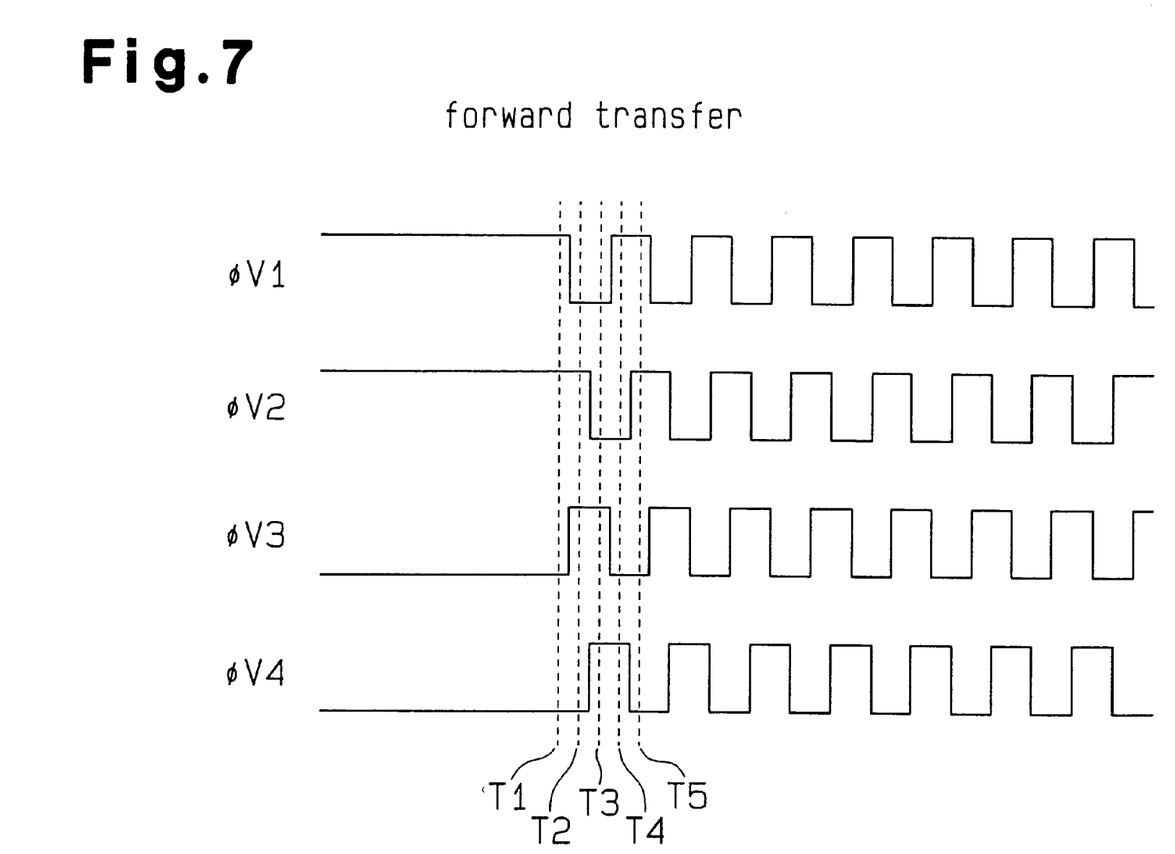
FIG. 7 is a timing chart of vertical clock signals $\phi v1$ to $\phi v4$ that are provided to a image sensor when information charges are transmitted in the forward direction.
Figure 8:
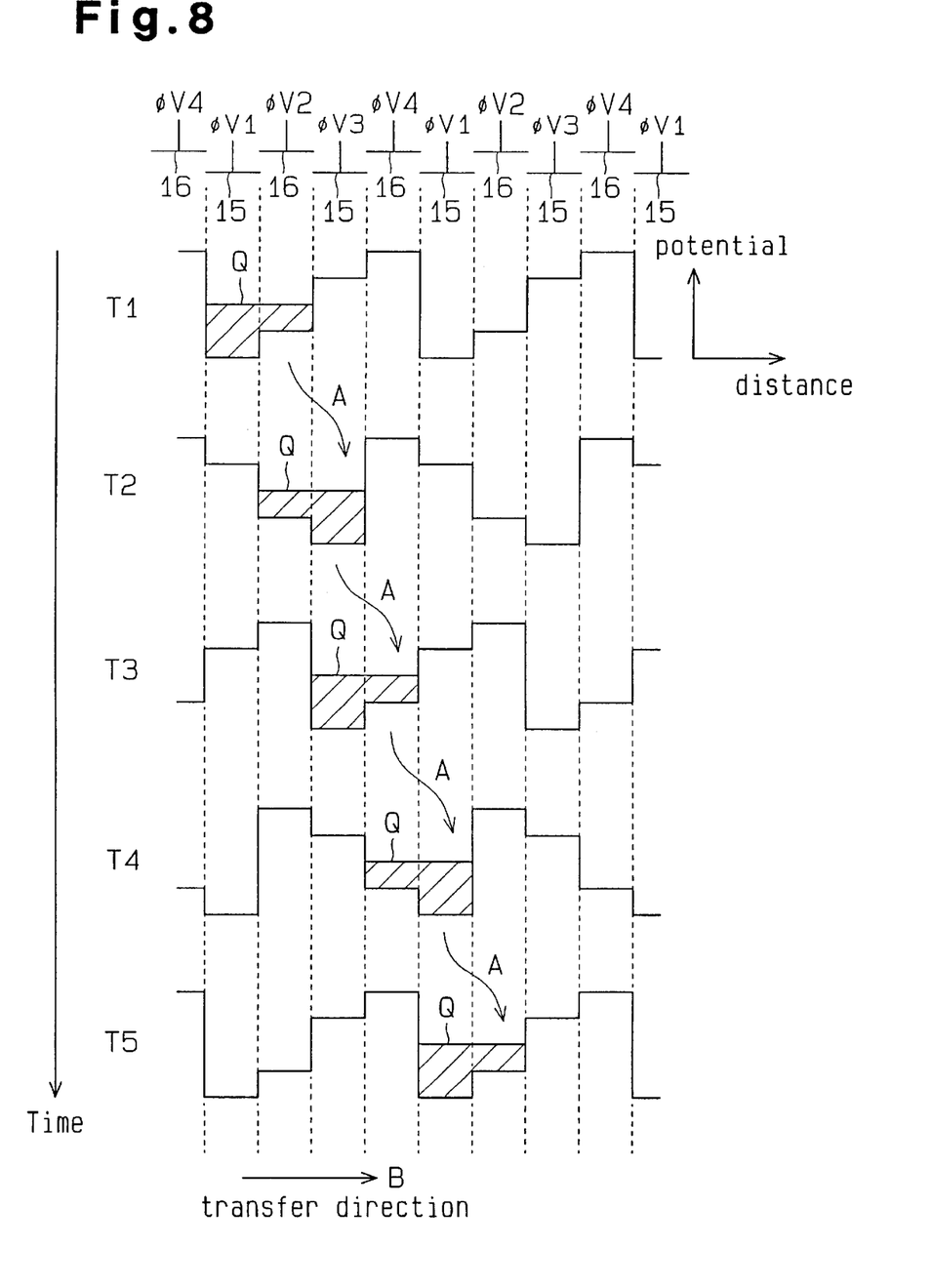
FIG. 8 illustrates information charges transmitted in the forward direction in accordance with the timing of FIG. 7.

FIG. 7 is a timing chart of four-phase vertical clock signals φv1 to φv4. FIG. 8 illustrates information charges transferred in accordance with the timing of FIG. 7. As shown in FIGS. 7 and 8, the vertical clock signals φv1 to φv4 are selectively applied to the gate electrodes 15, 16 at individual timings T1 to T5. This selectively enables the gate electrodes 15, 16. Accordingly, potential wells and barriers are formed at the individual timings T1 to T5 as shown in FIG. 8. The array of the wells and barriers vary depending on the location of the enabled gate electrodes 15, 16.

At the timing T1, an information charge packet Q is stored in a potential well in the vicinity of the electrodes 15, 16 at the left end of FIG. 8. The information charge packet Q moves as indicated by arrows A with the potential well, which moves over time. Accordingly, the information charge packet Q is moved in the direction indicated by an arrow B. In this manner, the information charges in the light-receiving section 1i are transferred to the storage section 1s.

Figure 9:
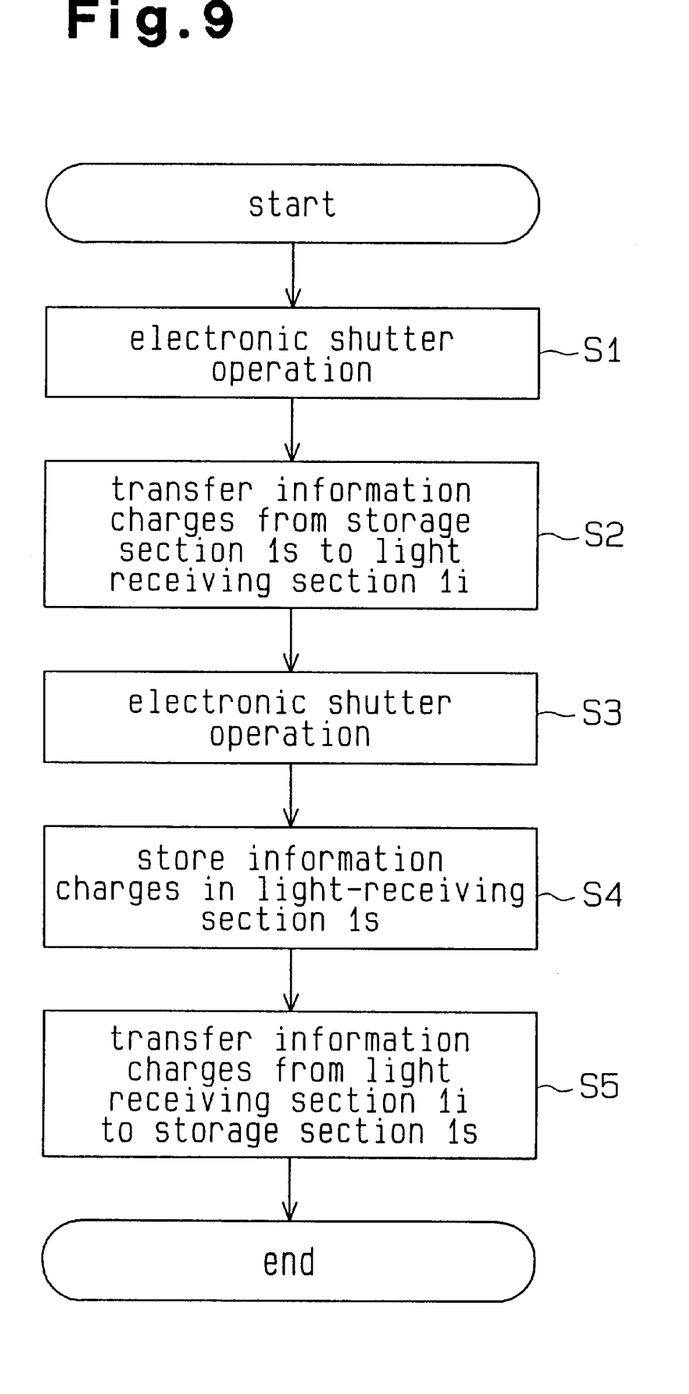
FIG. 9 is a flowchart illustrating the operation of the image sensor of FIG. 3.

FIG. 9 is a flowchart of the still image sensing mode according to the present invention. Prior to the image sensing, an electronic shutter operation is performed in step (hereinafter referred to as S) 1. This allows information charges containing noise caused by dark current generated in the semiconductor substrate 11 of the light-receiving section 1i to be discharged from the light-receiving section 1i in advance. Next in S2, a reverse transfer operation is performed. The reverse transfer operation transfers the information charges in the storage section 1s in a reverse direction from the storage section 1s to the light-receiving section 1i. This transfers information charges containing noise caused by dark current generated in the semiconductor substrate 11 of the storage section 1s from the storage section 1s to the light receiving section 1i. Another electronic shutter operation in S3 discharges the noise-containing information charges in the light-receiving section 1i.

In S4, an exposure operation for sensing a still image is performed for a predetermined period of time. This stores in the light-receiving section 1i information charges regarding the still image. In S5, a forward transfer operation is performed to transfer the information charges in the light-receiving section 1i to the storage section 1s. This finishes the still image sensing operation.

Figure 2:
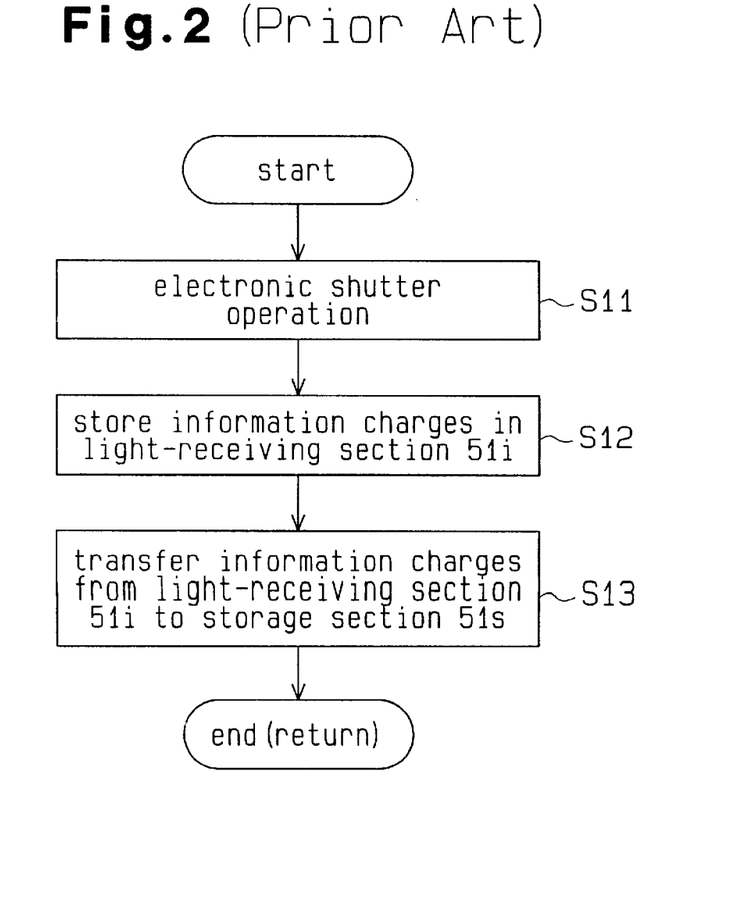
FIG. 2 is a flowchart for explaining the operation of the prior art image sensor.

The above process described in the flowchart of FIG. 9 differs from the prior art image sensing apparatus shown in FIG. 2 by the added steps S2 and S3.

Figure 10:
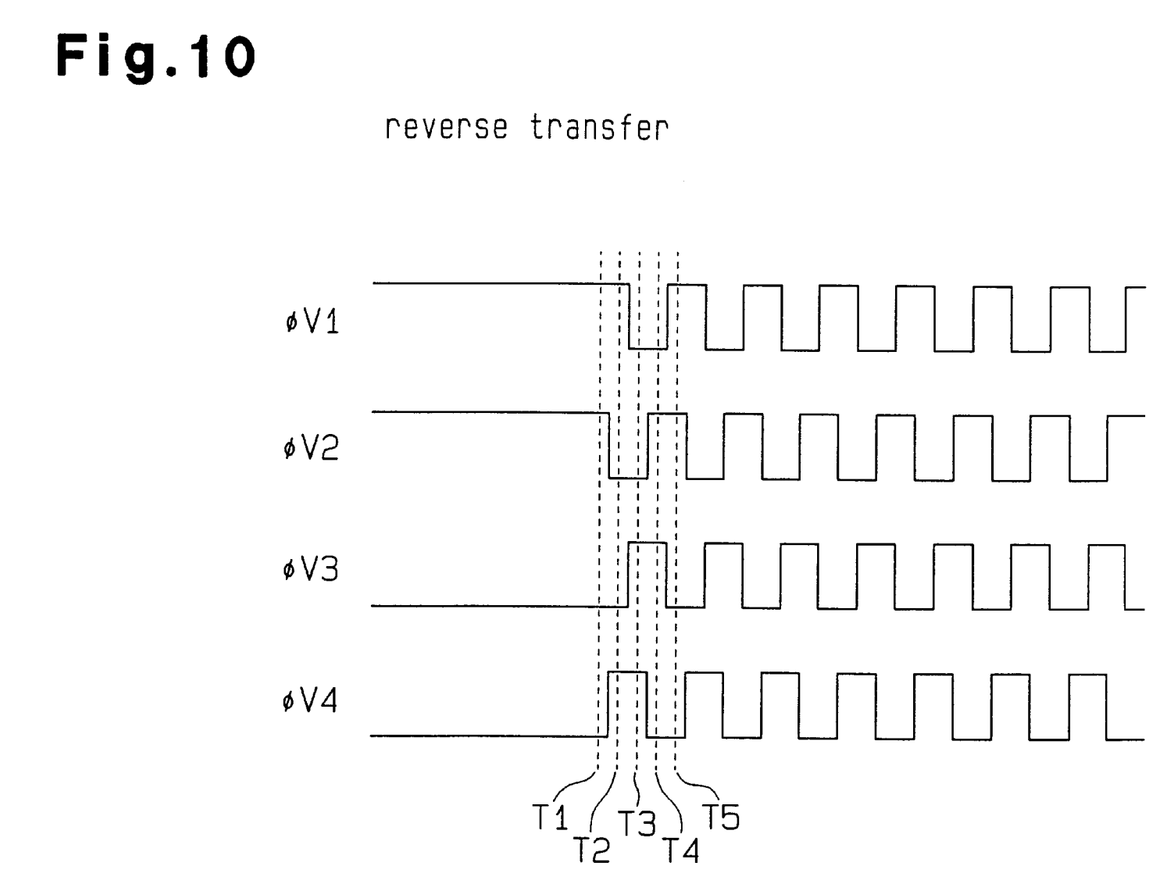
FIG. 10 is a timing chart of vertical clock signals $\phi v1$ to $\phi v4$ that are provided to a image sensor when information charges are transmitted in the reverse direction.

FIG. 10 is a timing chart of the four-phase vertical clock signals φv1 to φv4 in the reverse transfer operation in S2. FIG. 7 is a timing chart of the four-phase vertical clock signals φv1 to φv4 in the forward transfer operation in S5. The timing chart in FIG. 10 differs from the timing chart in FIG. 7 in that the phases of the second phase vertical clock signal φv2 and the fourth phase vertical clock signal φv4 are inverted at the times T2 and T4.

Figure 11:
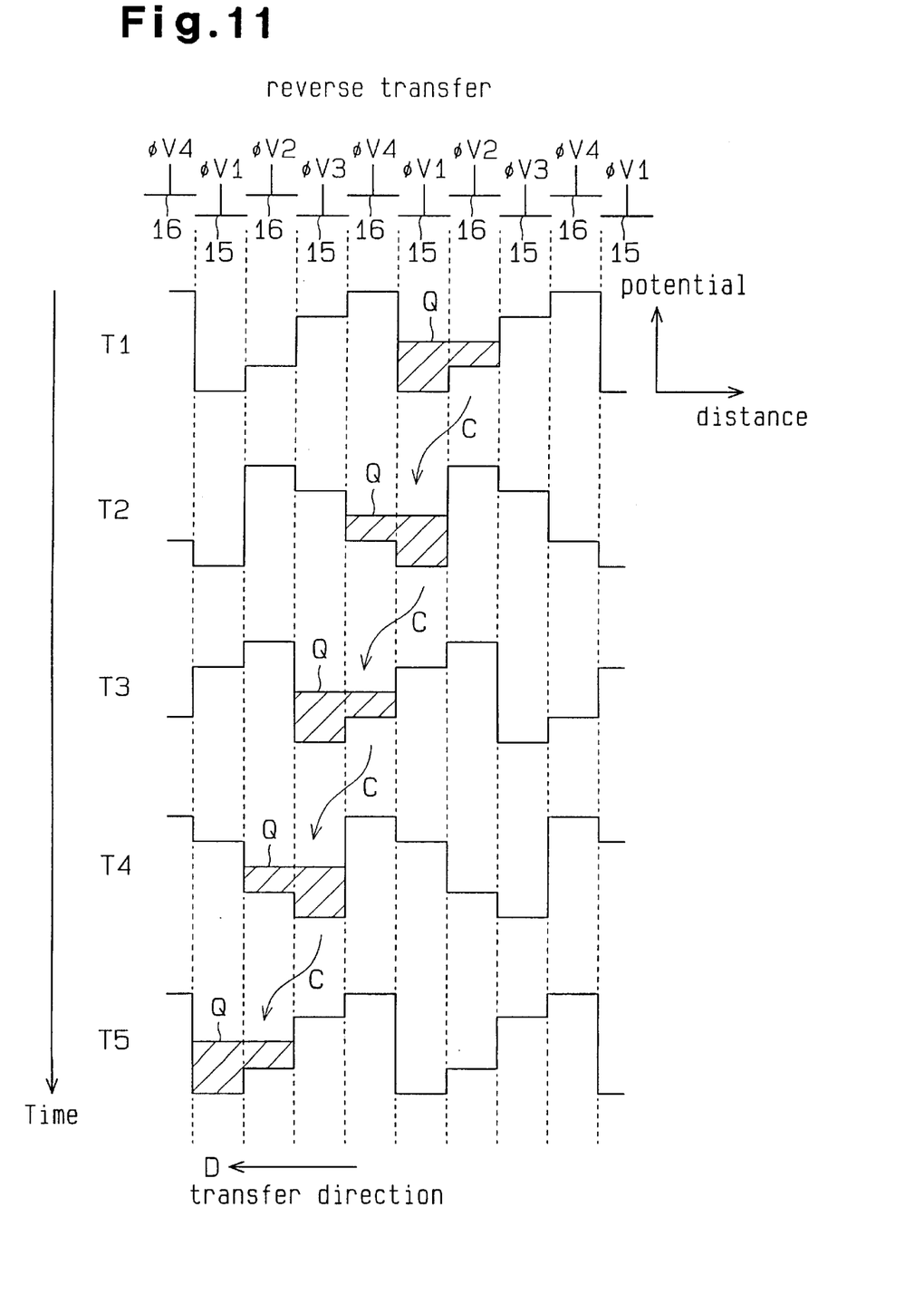
FIG. 11 illustrates information charges transmitted in the reverse direction in accordance with the timing of FIG. 10.

The vertical clock signals φv1 to φv4 are selectively applied to the individual gate electrodes according to the timing chart of the reverse direction transfer operation in FIG. 10. The information charge packet Q moves as described with arrows C as shown in FIG. 11. Accordingly, the information charge packet Q is transferred in the direction indicated by an arrow D. As a result, the information charge packet Q is transferred from the storage section 1s to the light-receiving section 1i in the reverse direction.

The above process has the following advantages.

The process of S2 and S3 discharges the information charges containing noise caused by dark current generated in the semiconductor substrate 11 of the storage section 1s. This prevents the noise caused by dark current from mixing with the image signal Y0(t) output from the image sensor 1. Since the storing time of information charges L is long, the process is particularly effective when the information charges stored in the storage section 1s contain a great amount of noise caused by dark current.

Simply inverting two of the four-phase vertical clock signals in the forward transfer operation enables the reverse transfer operation. More specifically, inverting the clock signals φv2 and φv4 in the timing chart in FIG. 7 converts the chart to the timing chart in FIG. 9 of the reverse transfer operation. This simplifies the structure of the vertical clock generating circuit 2v in the clock generator 2.

Although only one embodiment of the present invention has been described in detail herein, it should be apparent to those skilled in the art that the present invention may be embodied in many other specific forms without departing from the spirit or scope of the invention. Particularly, the present invention may be embodied in the following forms:

The present invention may be employed in a CCD solid state image sensor 1 of three phase vertical clock signals φv or five or more phase vertical clock signals φv. In this case, the phase difference of the clock signals φv in S2 is the inverse one of the phase difference of the clock signals φv in the process of S5.

The reverse transfer operation may be employed not only in the still image sensing mode, but also in the moving image sensing mode. In the moving image sensing mode, noise caused by dark current contained in information charges is so low that it causes few problems. However, employing the present invention further reduces the noise and therefore allows the image sensor to meet a future demand for a better signal-to-noise ratio.

Therefore, the present examples and embodiment are to be considered as illustrative and not restrictive and the invention is not to be limited to the details given herein, but may be modified within the scope of the appended claims.

What is claimed is:

1. An image sensing apparatus for sensing a target object and producing a still image signal, comprising:

a solid state image sensor including a light-receiving section having a plurality of light-receiving elements arranged in a matrix form, each light-receiving element storing an information charge generated in accordance with an incident light reflected from the target object and a storage section for temporarily storing the information charges transmitted element by element from the light-receiving section, wherein said solid state image sensor performs an electronic shutter operation for discharging the information charges in the light-receiving section; and a clock generator including a vertical clock generating circuit, a storage clock generating circuit, a horizontal clock generating circuit and a substrate clock generating circuit, said clock generator controlling the information charge transferred between the light-receiving section and the storage section of said solid state image sensor;

said clock generator performing a first discharging operation for discharging noise-containing information charges previously existing in the light-receiving section, a first transferring operation for transferring noise-containing information charges previously existing in the storage section in a reverse direction from the storage section to the light-receiving section, a second discharging operation for discharging noise-containing information charges transferred from the storage section into the light-receiving section, an image sensing operation for storing the information charges generated in accordance with the incident light reflected from the target object in the light-receiving section for a predetermined period of time, and a second transferring operation for transferring information charges stored in the light-receiving section in a forward direction from the light-receiving section to the storage section.

2. An image sensing apparatus according to claim 1, wherein the light-receiving section and the storage section of the solid state image sensor are formed in a semiconductor substrate, and wherein the noise-containing information charges originate from a dark current generated in the light-receiving section and the storage section.

3. An image sensing apparatus according to claim 2, wherein the clock generator generates a substrate clock signal to cause the information charges to be discharged by the first discharging operation and the second discharging operation.

4. An image sensing apparatus according to claim 1, wherein the clock generator generates first and second vertical clock signals to cause the information charges to be transferred by the first transferring operation and the second transferring operation.

5. An image sensing apparatus according to claim 4, wherein the first and second vertical clock signals are out of phase with one another.

6. An image sensing apparatus according to claim 4 further comprising a timing controller for controlling the timing of a substrate clock signal, the first vertical clock signal and the second vertical clock signal generated by the clock generator.

7. A method for driving a solid state image sensor including a semiconductor substrate having a main surface, a light-receiving section formed on said main surface having a plurality of light-receiving elements arranged in a matrix form, each light-receiving element storing an information charge generated in accordance with an incident light reflected from a target object, and a storage section formed on said main surface for temporarily storing the information charges transmitted element by element from the light-receiving section, said method comprising the step of:

discharging noise-containing information charges previously existing in the light-receiving section;

transferring noise-containing information charges previously existing in the storage section in a reverse direction from the storage section to the light-receiving section;

discharging noise-containing information charges transferred from the storage section into the light-receiving section;

storing the information charges generated in accordance with the incident light reflected from the target object in the light-receiving section for a predetermined period of time; and transferring information charges stored in the light-receiving section in a forward direction from the light-receiving section to the storage section.

* * * * *